United States Patent [19]
Kley

[11] 4,403,834
[45] Sep. 13, 1983

[54] ACOUSTIC-WAVE DEVICE

[75] Inventor: Victor B. Kley, Berkeley, Calif.

[73] Assignee: Kley & Associates, Berkeley, Calif.

[21] Appl. No.: 152,630

[22] Filed: May 23, 1980

Related U.S. Application Data

[63] Continuation-in-part of Ser. No. 60,027, Jul. 23, 1979, abandoned.

[51] Int. Cl.³ ............................ G02F 1/03; G02F 1/11; G02F 1/135
[52] U.S. Cl. ........................................ 350/371; 315/55; 350/330; 350/358; 350/393
[58] Field of Search ............................ 350/370-373, 350/330-331, 339, 358, 381, 393, 332-337, 34 E, DIG. 1; 358/201, 213, 235-236, 241, 63, 108; 356/234-235, 108-109; 315/55; 365/145-146, 45, 48; 307/400; 346/77 R, 77 E

[56] References Cited

U.S. PATENT DOCUMENTS

| | | | |
|---|---|---|---|
| 2,922,923 | 1/1960 | Yando | 315/55 |
| 3,035,200 | 5/1962 | Yando | 315/55 |
| 3,065,378 | 11/1962 | Zaks | 315/55 |
| 3,145,372 | 8/1964 | Suits et al. | |
| 3,151,316 | 9/1964 | Bobeck | |
| 3,173,745 | 3/1965 | Stone et al. | |
| 3,202,824 | 8/1965 | Yando | 315/55 |
| 3,212,072 | 10/1965 | Fuller | |
| 3,249,804 | 5/1966 | Aiken | 315/174 |
| 3,379,927 | 4/1968 | Yando | 315/55 |
| 3,400,363 | 9/1968 | Silverman | |
| 3,517,206 | 6/1970 | Oliver | 307/400 |
| 3,562,414 | 2/1971 | Blum | 350/149 |
| 3,597,758 | 8/1971 | Greeson, Jr. et al. | 340/789 |
| 3,625,591 | 12/1971 | Freiser | 350/331 R |
| 3,662,355 | 5/1972 | Kazan | |
| 3,668,662 | 6/1972 | Zimmerman et al. | |
| 3,701,147 | 10/1972 | Whitehouse | |
| 3,805,195 | 4/1974 | Miller | |
| 3,886,529 | 5/1975 | Bert et al. | |
| 3,890,604 | 6/1975 | Schroder | 365/145 |
| 4,065,791 | 12/1977 | Kowel et al. | 358/213 |
| 4,093,344 | 6/1978 | Damen et al. | 350/393 |
| 4,241,339 | 12/1980 | Ushiyama | 350/355 |

FOREIGN PATENT DOCUMENTS 864119  3/1961  United Kingdom ............... 365/145

OTHER PUBLICATIONS

Gross, B., "Charge Storage in Solid Dielectrics", Elsevier Pub. Co., 1964, pp. 1-2.
Sarid, D., "Contactless Addressable Liquid Crystal Display" Xerox Disclosure Bull. 9/10/78, pp. 329.
Smith, A. W. "Ferroelectric Optical Switch", IBM Tech. Disc. Bull. 7/66, pp. 180-181.
Heidrich et al. "Switching of Nematic Liquid Crystals by Surface Waves", IBM Tech. Disc. Bull., 6/72, pp. 165-167.

Primary Examiner—William H. Punter
Attorney, Agent, or Firm—Anthony A. O'Brien

[57] ABSTRACT

An acoustic wave display, scanning or storage device employs a light-modifying member which is responsive to acoustic wave energy in combination with a strobed electric field or light to produce an image or data point.

2 Claims, 21 Drawing Figures

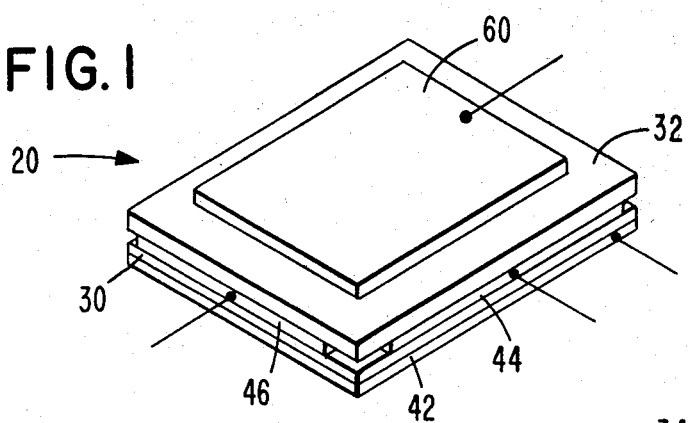
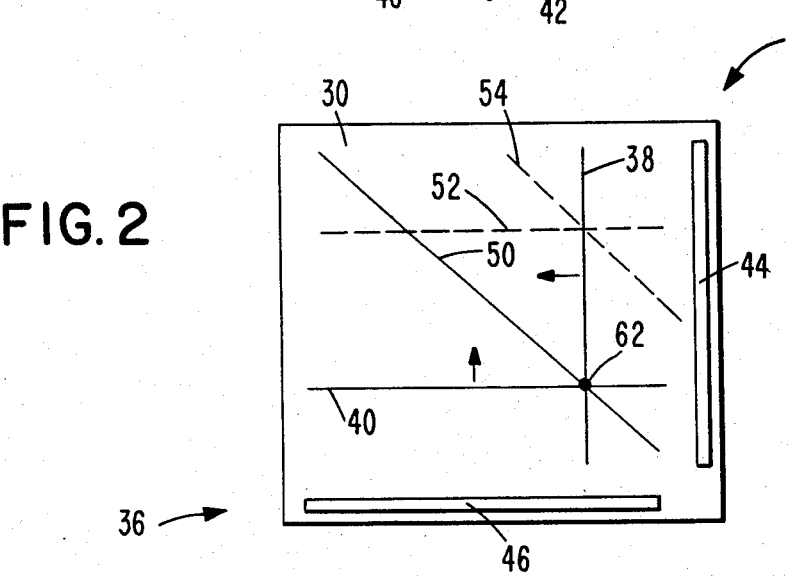
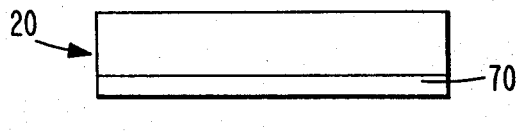
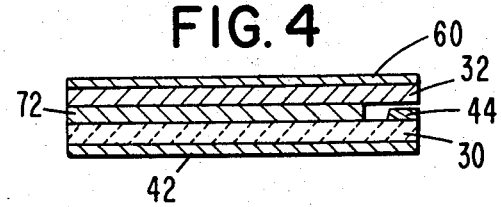
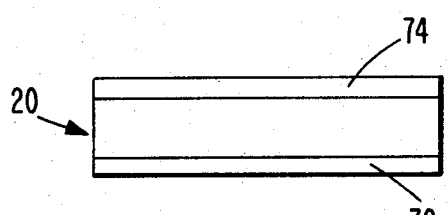
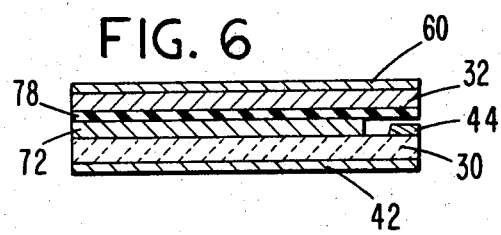
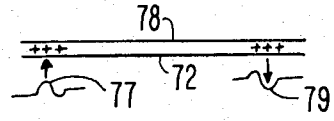

ACOUSTIC-WAVE DEVICE

CROSS-REFERENCE TO RELATED APPLICATION

This application is a continuation-in-part application of my co-pending U.S. application Ser. No. 60,027 filed July 23, 1979 and entitled ACOUSTIC DISPLAY OR SCANNING DEVICE and now abandoned. This prior co-pending application is incorporated herein by reference.

TECHNICAL FIELD

This invention relates to devices for displaying, scanning or storing information or images in one-dimension, two-dimensions or three dimensions.

DESCRIPTION OF THE PRIOR ART

One common display device is a cathode ray tube such as that employed in television units wherein an electron beam is deflected and used to excite a phosphor screen to produce a visible display. A cathode ray tube requires an evacuated glass tube and has a limited life since the electron gun generating the electron beam will eventually fail due to the deterioration caused by the elevated temperature at which it must operate. Furthermore, the cathode ray tube requires considerable three-dimensional size to produce a two-dimensional display in order to accommodate the electron gun and deflection units therein.

Planar two-dimensional display devices, such as illustrated in U.S. Pat. Nos. 3,173,745 and 3,597,758, are contained in the prior art and employ orthogonally arranged sets of electrodes wherein a pair of the electrodes, one in each set, may be selected to excite a point in a light emissive phosphor layer or plasma gas layer between the energized electrodes. The resolution of such devices is limited by the number and spacing of parallel lines or electrodes which can be disposed on the respective sides of the active display material. Also relatively complex indexing and addressing circuits must be used to access the large number of orthogonal drive lines.

Prior art memory devices and delay line devices, as exemplified in U.S. Pat. No. 3,145,372, No. 3,151,316, No. 3,212,072, No. 3,662,355, No. 3,668,662, No. 3,701,147, No. 3,805,195 and No. 3,886,529, employ piezoelectric, ferro-electric or magnetostrictive materials for generating and sensing acoustic waves containing digital information. The above U.S. Pat. No. 3,212,072 discloses the employment of a polarized beam of light for sensing acoustic waves in a magnetic film by means of differing rotation angles from compressive and tension portions of the wave. The above U.S. Pat. Nos. 3,662,355 and 3,886,529 disclose memory devices wherein a short burst of electrons is applied to a surface of a piezoelectric material to produce a stored surface charge corresponding to the acoustic waves in the piezoelectric material; a second burst of electrons results in reforming the acoustic waves which can be read out by an output transducer.

SUMMARY OF THE INVENTION

The invention is summarized in an acoustic-wave device including a light-modifying member having at least one elongated dimension and including a material responsive to a combination of a first energy condition accompanying an acoustic wave and a second energy condition applied momentarily when the acoustic wave is at a selected point such that a changed condition is produced at the situs of the acoustic wave during the momentarily applied second energy condition, means for applying an acoustic wave having the first energy condition to the light-modifying member, strobe means for momentarily applying the second energy condition to the light-modifying member throughout the length of the one elongated dimension, and the changed condition including a spatial change in light impinging on the member to produce an image including a spot at the selected point.

An object of the invention is to construct a display or scanning device which is reliable and has high resolution.

Another object of the invention is to employ an acoustic wave together with a momentarily applied second energy, such as an electric field, burst of light, magnetic field, etc., to produce spatial light change to generate an image.

It is also an object of the invention to eliminate the need for pluralities of parallel electrode lines for indexing display devices.

An advantage of the invention is that a particular point in an image can be generated by applying a strobing energy signal when an acoustic wave reaches the situs of the point.

Other objects, advantages and features of the invention will be apparent from the following description of the preferred embodiments taken in conjunction with the accompanying drawings.

BRIEF DESCRIPTION OF THE DRAWINGS

FIG. 1 is a perspective diagrammatical view of an acoustic-wave device constructed in accordance with the invention.

FIG. 2 is a plan view of a lower portion of the device of FIG. 1.

FIG. 3 is an elevation view of a modification of the display device of FIG. 1.

FIG. 4 is an elevational cross-section view of a variation of the display device in accordance with the invention.

FIG. 5 is an elevation view of another modification of the display device of FIG. 1.

FIG. 6 is an elevational cross-section view of another variation of the display device in accordance with the invention.

FIG. 7 is a diagram of energy wave forms storing and erasing charges in the device of FIG. 6.

DESCRIPTION OF THE PREFERRED EMBODIMENT

Figure 15:
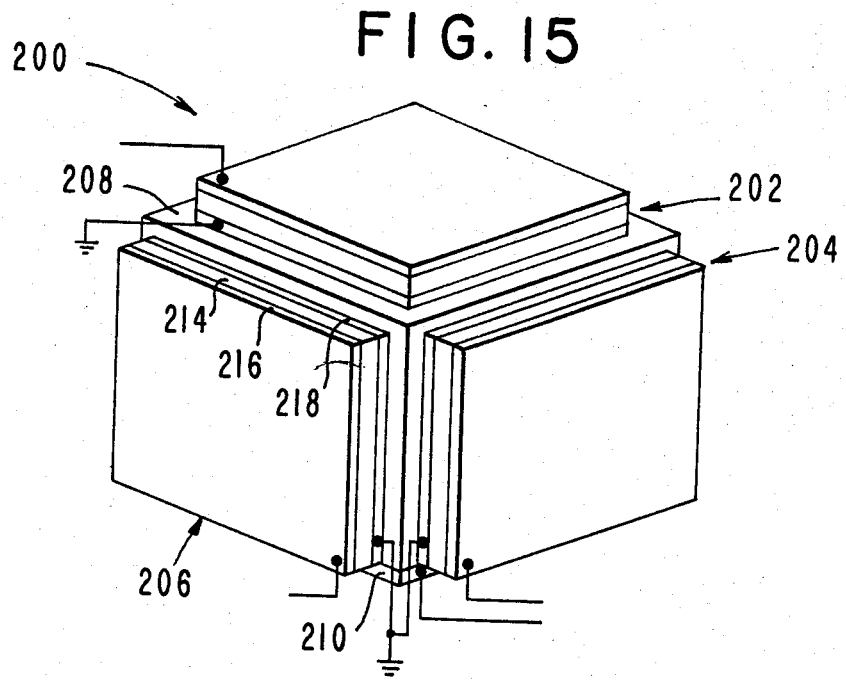
FIG. 15 is a perspective diagrammatical view of a three-dimensional acoustic-wave device in accordance with the invention.
Figure 18:
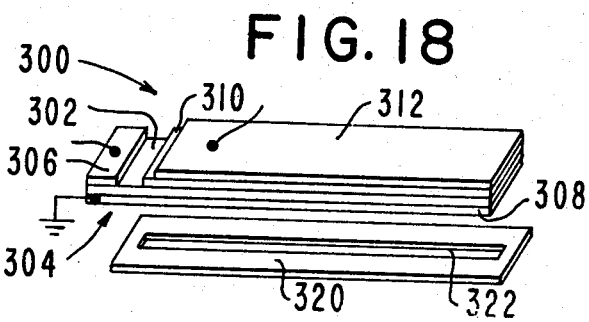
FIG. 18 is a perspective diagrammatical view of a one-dimensional device in accordance with the invention.

The acoustic device of the present invention may be one-dimensional, two-dimensional or three-dimensional. A device indicated generally at 20 in FIG. 1 is two-dimensional; a device indicated generally at 200 in FIG. 15 is three-dimensional; and a device indicated generally at 300 in FIG. 18 is one-dimensional.

As illustrated in the two-dimensional device 20 of FIGS. 1 and 2, one embodiment of the invention includes a light-modifying member 32, an acoustic wave plate 30 for applying acoustic waves to the member 32, and strobe facilities 60 for applying short energy pulses to the light-modifying member 32 when an acoustic wave or waves are at a selected position or positions. An energy condition, such as a piezoelectric potential, a mechanical stress, displacement, etc., accompanies an acoustic wave which travels at a relatively slow speed, i.e. the speed of sound, along at least one elongated dimension of the light-modifying member 32. The short energy pulses, such as momentary electric fields, bursts of light, momentary magnetic fields, etc., from the strobe facilities 60 travel at a relatively fast speed, i.e. the speed of light, and have a duration which lasts for only a very short segment of travel of the acoustic wave so as to define a point or a line at the situs of the acoustic wave during each short energy pulse. The light-modifying member 32 is responsive to the combination of the short energy pulses and an energy condition accompanying the acoustic wave to produce a spatial change in light impinging on the light-modifying member to produce an image; the light impinging on the member 32 may be the same light passed momentarily by the strobe 60 or may be a continuous or other strobed light which is changed by a remanent changed condition in the light-modifying member caused by the combination of the acoustic wave and the short energy pulses. The modified light may be transmitted through or reflected from the device 20 to produce an image or to scan a selected image projected on the device 20.

In the two-dimensional device 20 of FIGS. 1 and 2, the light-modifying member 32 is a summation-energy-responsive optic layer 32. The acoustic wave generator 30 is formed by an acoustic plate and a pair of acoustic wave generators indicated generally at 34 and 36 for generating acoustic waves 38 and 40 which travel in the acoustic plate 30 in respective directions which cross each other. For example, the acoustic plate 3 can be a piezoelectric plate and the energy wave generators can include a common bottom electrode 42 covering the bottom surface of the plate 30, a first strip electrode 44 on the upper surface of one edge portion of the rectangular plate 30, and a second strip electrode 46 on the upper surface of a second outer edge portion of the rectangular plate; the second strip electrode being disposed at a right angle with the electrode 44 so as to generate orthogonally related energy wave pulses 38 and 40.

Figure 21:
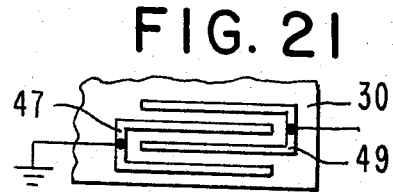
FIG. 21 is a plan view of a modified acoustic wave generator.

Alternatively, other types of energy wave generators, such as magnetostrictive devices, etc., may be employed. One alternative acoustic wave generator is illustrated in FIG. 21 and includes conventional electrodes 47 and 49 on the upper surface of plate 30 for generating the energy wave 38 in the piezoelectric plate 30; similar surface electrodes (not shown) are included in this alternative to generate the energy wave 40.

The waves 38 and 40, generated in a selected relative time relationship to cross one another, define a line of intersection 50 where summation energies are produced by the crossing energy waves 38 and 40. The position of the line of intersection 50 can be changed to run diagonally across any portion of the plate 30 by varying the relative timing of the energy waves 38 and 40 produced by the generators 34 and 36; for example, if the energy wave 40 were advanced relative to the energy wave 38 as shown by the dashed line 52, then an intersection line indicated by the dashed line 54 would be produced. It is noted that it is not necessary that the wave fronts 40 and 38 be orthogonally related or be linear; it is only necessary that the energy waves 38 and 40 traverse the plate 30 in crossing directions. For example a pair of spaced point electrodes would produce semicircular crossing wave fronts in the plate 30 to produce intersectional lines of summation energies. Further, the device 20 may have any shape, such as being curved, in accordance with a desired display; i.e. the plate 30 and optic layer 32 can be curved or otherwise shaped as desired as an alternative to the illustrated flat configuration.

The optic layer 32 engages the surface of the energy wave plate 30 and is responsive only to summation energies such as along the intersection line 50; i.e., the material of the optic layer 32 changes its optic state at a selected point only upon application of a point energy value exceeding a threshold energy value which is greater than the individual point energy values along the energy waves 38 and 40 but below the summation point energy values along the intersection line 50. The optic material 32 at the summation energy point changes an optic characteristic, such as transparency, opacity, bi-refringence, color, light emissivity, light reflectivity, light scattering, etc., in response to energy above the threshold value.

The strobing device 60 may be in the form of an electrode for energizing the optic material 32, may be a light switch such as a Kerr cell, etc. In one particular example, the plate 30 is a piezoelectric plate cut to produce a selected voltage on its upper surface along the acoustic waves 38 and 40, the optic material 32 is an electro-optic material such as a nematic fluid or other electro-responsive liquid crystal material, and the strobing facility 60 is a transparent electrode overlying the electroresponsive material and which cooperates with the electrode 42 which is also transparent. An electric pulse applied to the electrode 60 when the waves 38 and 40 are at the position as shown in FIG. 2 generates a spot or point indication 62. The electric pulse has a magnitude less than the difference between the excitation threshold voltage of the nematic material 32 and the piezoelectric potential in a single wave 38 or 40, but has a magnitude greater than the difference between the excitation threshold voltage of the nematic material 32 and the piezoelectric potential at the crossing point 62 of the waves 38 and 40. The energy waves 38 and 40 and the strobing pulses are produced at frequencies to generate a complete display or scan at a sufficient rate to appear to be continuous. Some electro-optic materials retain their changed states for a period after the excitation voltage is removed so the image or scanning spot can be made continuous.

The device 20 of FIG. 1 may be employed in the transmissive mode or a reflective mode. In the transmissive mode the electrodes 42 and 60 as well as the energy plate 30 are transparent so that light may pass through the device in accordance with the image or scanning spot formed in the optic layer 32. In a reflective mode, light need pass only through one side of the device to the optic layer 32 and then be absorbed and reflected in accordance with the image formed in the optic layer 32.

Luminescent materials may also be employed. These luminescent materials may be directly responsive to the strobed summation energies or may be responsive to transmitted radiant energy through the layer 32.

In a modified display device shown in FIG. 3, a backing 70 is applied to the device 20 of FIG. 1 which operates in the transmissive mode. The backing has a selected reflectivity, darkness or opacity, to transform the transmissive device 20 into a reflective device.

In a variation of the device as shown in FIG. 4, a junction or voltage barrier 72 is disposed between the upper optic conductor 60 and the piezoelectric layer 30, for example the junction or voltage barrier 72 may be located between the optic material 32 and piezoelectric plate 30. This junction 72 is selected to produce a desired threshold for activating the optic layer 32 and may be in the form of a PN semiconductor junction. The barrier layer 72 serves to select only the summation voltages along the intersection line 50 to activate the electro-optic material 32.

In another modified device illustrated in FIG. 5, the device 20 is positioned between polarizers 74 and 76, either crossed or having the same polarity. The optic material 32 of the device 20 is either a material which becomes birefringent in response to the summation energies along the intersection line 50, or is a material which is normally birefringent and becomes non-birefringent in response to the summation energies along the intersection line 50. The birefringent property of these materials is changed by an electrical voltage, by a mechanical stress or by displacement created by the summation energy. The device of FIG. 5 can be operated in the transmissive mode or can be converted to a reflective mode such as that shown in FIG. 3.

Some materials, including some piezoelectric materials, exhibit changes in polarization or birefringence at a point of stress enabling the acoustic wave plate 30 to operate as the light-modifying member. Thus by proper selection of the magnitude of a pair of acoustic waves, selected polarization of birefringence property change can be limited to an intersection line defined by the points of summation energies of the crossing acoustic waves within the plate 30. One or more polarizing layers 74 and 76 appropriately oriented relative to the plate 30, or each other, serve to limit light transmissivity or opacity to the intersection line. Strobing can be accomplished by switching the entire electro-optic layer 32, or by externally generated light pulses, such as from a laser; in this latter alternative the electro-optic layer 32 can be eliminated.

In another alternative, the device may include one or more light interference layers for the optic layer 32 responsive to the summation energies. Light reflected by the interference layer is changed by the mechanical displacement at the summations or crossing points of the acoustic waves.

In another variation, shown in FIG. 6, a dielectric layer 78 is placed on top of the junction or barrier 72 to form a trap for a charge conducted by the barrier layer 72. In this variation, charge is stored for a short period of time at the selected points between the barrier layer 72 and the dielectric layer 78 so that several points of a complete display or scan are produced upon each strobe signal. As illustrated in FIG. 7, a positive portion 77 of an electro-energy summation point can be used to write a charge, and a negative portion 79 can be used to erase a charge, or vice versa, during a strobe signal.

The resolution of the present display or scanning device is dependent upon the width of the energy waves and the properties of the materials employed. The time required for generating one complete scan or two dimensional display is dependent upon the velocity of acoustic waves in the plate 30; however, this velocity is sufficient that a fairly large screen (1 foot square) can be completely scanned at a rate sufficient to avoid flicker, i.e., 30 times a second.

Figure 19:
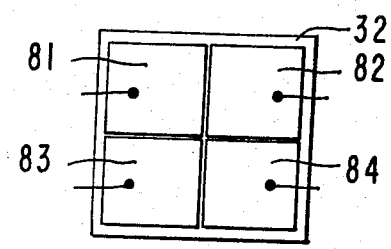
FIG. 19 is a plan view of a modification of the two-dimensional device of FIG. 1.

Increased speed in image generation results from the modification of FIG. 19 wherein the strobing facility 60 of FIG. 1 is replaced by a number of separate strobing facilities, such as strobing facilities 81, 82, 83, and 84, corresponding to different regions of the display. These regions preferably have equal dimensions. A plurality of acoustic waves, separated only by the width or length of the regions, are used to scan the display increasing the image generation speed to a multiple of the number of regions. In an alternative, the electrode 60 of FIG. 1 is replaced by parallel conductive strips and the portion of the electrode 42 which is disposed under the display portion of the device is also replaced by parallel conductive strips which are orthogonally related to the strips replacing electrode 60; selective energization of a pair of strips, one on top and one on bottom, thus strobes only a small region to produce a point display only within that region. Crossover points of energy waves in nonenergized regions will not be displayed.

Figure 8:
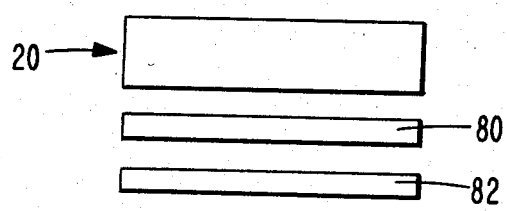
FIG. 8 is a diagrammatical elevation view of one particular application of the display device of the invention employed in a recording apparatus.

In addition to displaying video information, data, and the like directly to a user, the present display device can be used in various other applications. In one particular application of the device 20 as shown in FIG. 8 for producing a record or memory of the information, the device 20 is positioned over a removable backing or barrier 80 covering a recording strip or member 82. The recording strip or member 82 may be a photographic film, a relatively persistent phosphor layer for retaining the image produced by the device 20, or an electrostatic reproducing member such as employed in xerography. The barrier 80 may be a removable shutter or may be an electronic shutter, such as a Kerr cell or the like.

Figure 9:
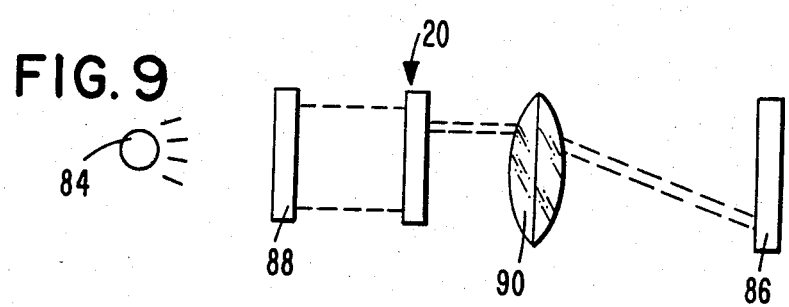
FIG. 9 is a sketch of a scanning projector employing the present display device.

In a projector illustrated in FIG. 9, the device 20 is positioned between a source of light 84 and a screen 86 and the device 20 is operated to project an image onto the screen 86. Optionally, there may also be included a filter 88 between the source 84 and the device 20, and an optic system 90 between the device 20 and the screen 86. The filter 88 would produce a desired color of light while the optic system would be utilized to enlarge or otherwise affect the image.

Figure 10:
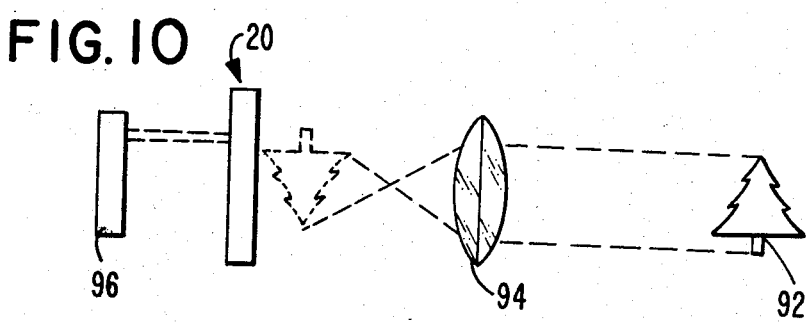
FIG. 10 is a sketch of a scanning camera employing the device of the present invention.
Figure 11:
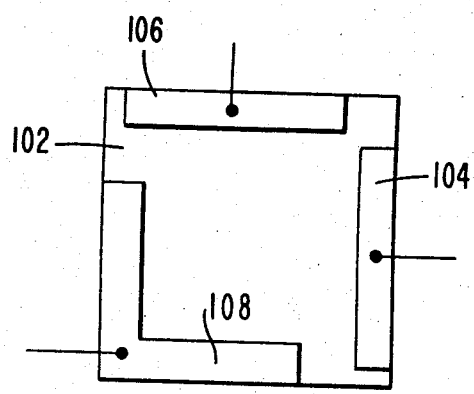
FIG. 11 is a bottom view of a quartz plate in the test device of FIG. 12.
Figure 12:
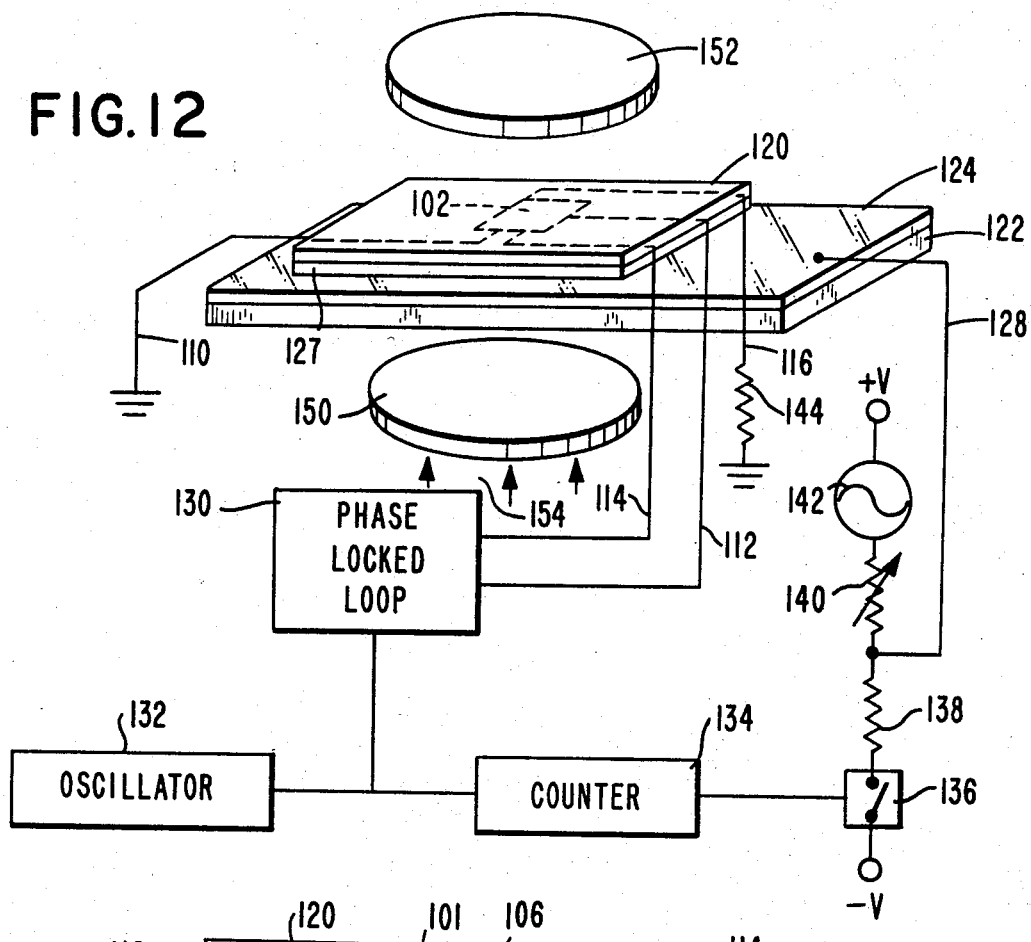
FIG. 12 is a perspective view of a test device with electronic circuitry shown schematically for operating the test device.
Figure 13:
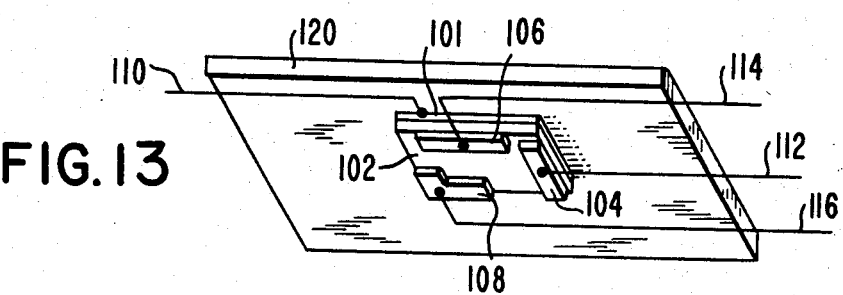
FIG. 13 is a perspective view taken from the bottom right front of a top portion of the test device of FIG. 12.
Figure 14:
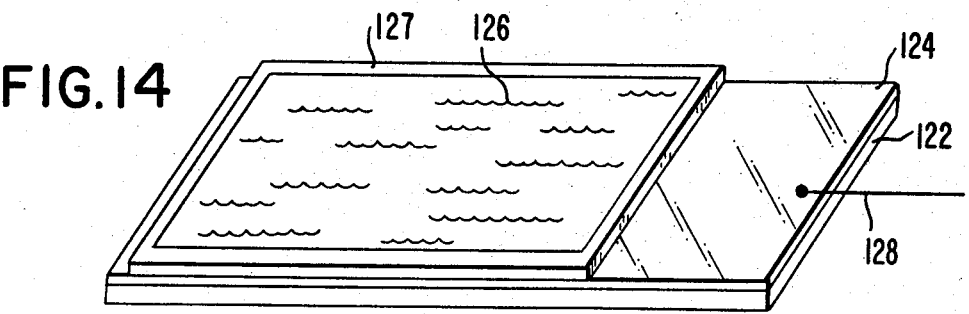
FIG. 14 is a perspective view taken from the top right front of a bottom portion of the test device of FIG. 12.

In a camera for producing an electrical signal corresponding to an image illustrated in FIG. 10, an image of an object 92 is projected by a lens system 94 onto the device 20. A detector 96 is positioned behind the device 20 which is operated to scan the image so that the detector 96 produces a video electrical signal corresponding to the image 92.

Color projectors and cameras may be produced by utilizing three systems similar to that of FIG. 9 or 10 wherein a separate primary color filter is employed in each system to limit each system to one of the primary colors. In the projector, the colors are superimposed on the screen. In the camera a suitable electronic circuit is used to generate conventional color video signals. Alternatively, color can be generated by sequentially inserting different color filters between successive scans or projections to generate the information corresponding to the separate color of the object.

The present device may also be used in holographic applications. For example, transmissive images formed as holographic diffraction patterns can be generated in the device and used to modulate coherent light so as to create a holographic three dimensional image.

In a specific example illustrating the principles of the present invention, a test device shown in FIGS. 11-14 is formed from readily available materials. An x-cut quartz plate 102, about 1.5 centimeters square and 0.08 millimeters thick, is coated on one side with a transparent conductor 101 and is masked and coated on the other side with orthogonally arranged gold electrodes 104 and 106 on respective edges of the quartz crystal. A termination conductor 108 is formed on the edges of the upper surface of the crystal plate 102 opposite to the terminals 104 and 106. Electrical wires 110, 112, 114 and 116 are connected to the respective terminals 101, 104, 106 and 108 by means of a silver epoxy material and the bare electrodes and wires are covered with an insulating coating of silicone rubber, which is also used to bond the top surface of the crystal plate 102 to the underneath side of a LEXAN mounting plate 120. A commercial LCD display, such as that produced by Hamlin Corporation, is taken apart leaving the substrate 122, transparent conductive coating 124, and the nematic material 126 surrounded by a dam 127 on the coating 124. The conductive layer 124 is connected to a wire 128 by the silver epoxy material. The cover support 120 is placed on the top of the nematic material 126 so that the surface of the crystal 102 engages the nematic material.

The test device is connected to an electrical test scanning circuit including a phase-locked loop circuit 130 having two outputs which can be phase adjusted relative to each other and which are connected by the wires 112 and 114 to the respective electrodes 104 and 106. An oscillator 132 drives the phase locked loop circuit 130 and a counting circuit 134 which operates an electronic switch 136 connected between one terminal of a voltage source and a resistance divider including a resistance 138, a variable potentiometer 140, and an alternating current source 142. The intermediate junction of the voltage divider is connected by the wire 128 to the conductive layer 124 for being operated by the switch 136 to strobe the device. The common electrode 101 on the quartz plate is connected to ground while the termination electrode 108 is connected by a resistance 144 to ground.

In operation of the test device and circuitry of FIGS. 11-14, pulses having a selected phase relationship are applied by the phase locked loop circuit at 130 to the respective electrodes 104 and 106. In synchronism with the wave pulses, the counter 134 operates the switch 136 after a selected delay time to strobe the electrode 124. The threshold voltage is adjusted by the potentiometer 140 so that only the points corresponding to the summation of the energy waves generated by the respective electrodes 104 and 106 produce a change or spot in the optic material of the test device. Light passing through a polarizer 150, the test device and a polarizer 152 is observed. It is seen that spots defining an intersection line are clearly visible in the test device. The termination resistor 144 substantially reduces extraneous spots produced by reflections of the wave pulses.

Figure 16:
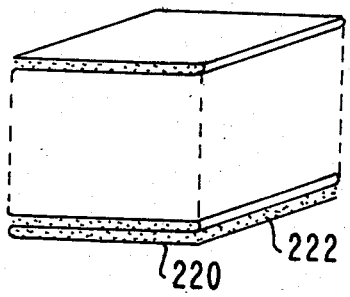
FIG. 16 is a perspective view of one variation of a light-modifying portion of the device of FIG. 15.
Figure 17:
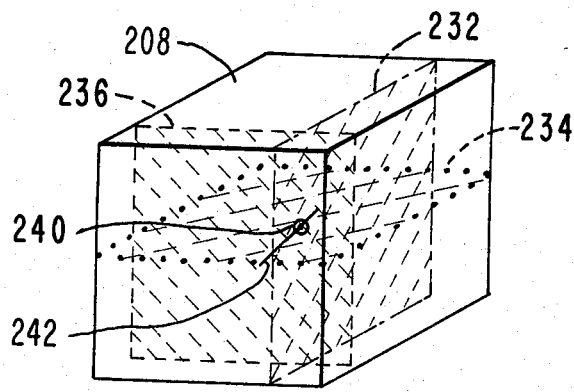
FIG. 17 is a perspective view of a light-modifying portion of the device of FIG. 15 but illustrating the production of an image point.

The three-dimensional device 200 of FIGS. 15-17 includes three acoustic wave generators indicated generally at 202, 204 and 206 and mounted on respective perpendicular faces of a cube 208 which has a strobing means 210 mounted on a fourth face thereof. Each of the acoustic wave generators 202, 204 and 206, by way of example, include a piezoelectric plate 214 with a pair of electrodes 216 and 218 on the opposite faces thereof; the electrode 218 of the top acoustic wave generator 202 also cooperating with the strobing electrode 210 to permit the establishing of a voltage gradient across the cubic light-modifying member 208. The strobing means 210 may be an electrode, a light switch, a laser, a magnetic field generator, or other short-pulse high speed energy producing means. The cube 208 is formed from an optical material responsive to a combination of an acoustic summation energy along line 242 and a short strobing energy pulse, such as a momentary electric field, light pulse, magnetic field, etc., to produce an image spot 240 or spot of optionally changed condition. The line 242 is defined by the common intersection points of three acoustic waves 232, 234 and 236 generated by the acoustic wave generators 202, 204 and 206. The instantaneous point energies generated along line 242 are sums of energies in each of the waves 232, 234 and 236 and exceed instantaneous point energies in a single wave or along intersection lines of only two waves. The energies in the waves 232, 234 and 236 and the summation energy along line 242 are selected so that an optical change threshold is only exceeded at a point on line 242 during a short strobing energy pulse. The position of the line 242 can be selected to pass through any point in the cube 208 by selecting the relative timing of acoustic waves 232, 234 and 236.

For example, cube 208 may be composed of an electrostrictive material such as barium titanate. The amplitudes of the acoustic waves 232, 234 and 236 are chosen such that their sum at each point along line 242 causes only the energies at points along line 242 to momentarily exceed the curie temperature as the acoustic waves progress through the material. If a momentary electric voltage is applied to electrode 210 to generate an electric field pulse when the acoustic waves 232, 234 and 236 are positioned as shown in FIG. 17, the spot 240 of electrostrictive material becomes electrically polarized, the electrical polarity becoming frozen at the spot 240. The duration of the electric field pulse is selected to last for only a short travel distance of the waves 232, 234 and 36 so that the electrically polarized spot 240 is relatively small. The electrically polarized spot has a different optical characteristic, such as birefringence, than the remaining non-polarized portion of the cube 208. Polarizers and a light source similar to that described above for the two dimensional devices, can be used to display or view the three-dimension image including the spot in the cube 208.

In another variation of the three-dimensional device, the cube 208 is in the form of a tank containing an optically clear electret together with a liquid crystal or other electro-optical material. For example, in FIG. 16, there is shown a folded film 220 of electret material with layers of liquid crystal material 222 interposed between the folded layers of electret. The electret film 220 may be of the type sold under the trade name FILTRETE by 3M Corporation. Other types of layered electret and electro-optic material or porous electret bodies filled with electro-optic material can be used for the light-modifying member 208. The electret material is selected to be heated or otherwise raised above a threshold only at a point where acoustic waves from the three acoustic wave generators 202, 204 and 206 cross to assume a set polarity upon the application of a voltage pulse to the strobing electrode 210 at a selected point within the cube.

The cube 208, in other possible three-dimensional devices, may be formed from or contain a material which exhibits a change in color, refractive index, polymerization, opacity, etc. in response only to the summation energy at the intersection of the three acoustic waves 232, 234 and 236. The change in the cube 208 need last only for the duration of a selected energy pulse, such as light, from the strobe means 210; the scanning by the acoustic waves and the operation of the strobe means being fast enough to produce a three-dimensional image which can be viewed. Where the change in the cube is longer lasting, the change is brought about by only the combination of the short strobe energy pulse and the summation energy at the intersection of the three acoustic waves.

Operation of the three-dimensional device of FIG. 15 is illustrated in FIG. 17. Three acoustic waves 232, 234 and 236 generated by the respective acoustic wave generators 202, 204 and 206 have mutually intersecting points 240 defining a diagonal line 242 extending in the cube. The line may be changed to any position within the cube by changing the relative timing of the acoustic waves from the generators 202, 204 and 206. At a selected point or points along the line 242 the strobe 210 is energized to apply a short energy pulse to the cube which results in the producing of one or more points of a three-dimensional image in the cube. Subsequent acoustic wave-scanning lines and strobe energy pulses produce the remaining points of the three-dimensional image. Where the optical change in the points of the cube last for only the duration of the strobe energy pulse or other short duration, the acoustic scanning waves and strobe energy pulses are continuously repeated to produce a continuous image.

Where the optical point changes are frozen in material, such as in the electrostrictive material or the electret material, points can be erased by again accessing the point by the three crossing acoustic waves in the absence of an electric field from the electrode 210.

In the electret material, such as the folded material of FIG. 16, the three-dimensional image can be made visible by applying a voltage to the electrode 210 which raises the voltage gradient across each layer 222 of liquid crystal to just below the threshold voltage; the voltage gradient at points adjacent the stored points of electrically polarized electret material being of a polarity and magnitude sufficient to raise the adjacent area of liquid crystal material above the threshold voltage to produce a visible indication of the point. If the response of the liquid crystal material is also selected to be stress sensitive, individual layers or planes of the cube can be selected for display by timing the readout voltage on the electrode 210 to the position of a single acoustic wave at the selected plane; the liquid crystal material being only responsible to the summation of the energies from the polarized electret, the electric readout field from the electrode 210 and the acoustic wave. Where the liquid crystal material employs birefringence, light polarizers (not shown) are used to render the image visible.

The one-dimensional acoustic wave device 300 shown in FIG. 18 requires ony one elongated dimension for scanning along a line. The generator includes an elongated acoustic plate 302 having an acoustic wave generator indicated generally at 304 at one end thereof formed by an electrode 306 on the top side and a common electrode 308 extending the length of the plate 302. Alternatively, the acoustic wave generator illustrated in FIG. 21 may be employed or any other acoustic wave generator. An electro-optic layer 310 is mounted on the acoustic plate 302 with a strobing facility 312 on top of the electro-optic layer 310. A line-forming line-filtering device 320 formed of an opaque body and having a slit 322 formed therein is mounted on the underside of the generator 300. The line filter 320 is shown removed from the device 300 for the sake of clarity in FIG. 18, but may be an integral part thereof.

The line-scanning or display device 300 of FIG. 18 operates in a manner similar to the acoustic wave device of FIG. 1 except that the electro-optic material 310 responds directly to the acoustic wave as it travels throughout the length of the device. Points are selected in the line by pulsing the strobing facility 312, by passing pulses of light, by generating an electric field, or by application of other rapid strobing energy. Furthermore, conventional polarizers (not shown) can be employed where the electro-optic layer 310 utilizes a birefringent effect. Alternatively, an electro-optic effect in the acoustic plate conventional polarizers (not shown) can be employed where the electro-optic layer 310 utilizes a birefringent effect. Alternatively, an electro-optic effect in the acoustic plate 302 can be exploited by replacing the electro-optic layer 310 and the electrode 312 with a light-switching device such as a Kerr cell.

Figure 20:
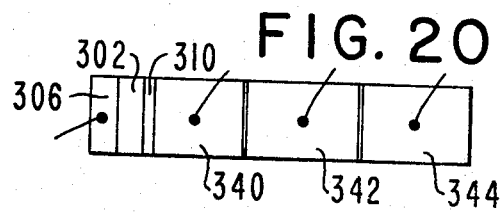
FIG. 20 is a plan view of a modification of the one-dimensional device of FIG. 18.

In operation of the line device of FIG. 18, a photosensitive material may be passed underneath the device and the device operated to select points and produce an image on the film moving underneath the device. The resolution of the device can be increased as shown in the modification of FIG. 20 wherein the strobing device 312 is divided into a plurality of segments extending along the length of the device, e.g. segments 340, 342 and 344. Thus a plurality of acoustic waves separated by the length of the segments 340, 342 and 344 can by simultaneously propagating in the acoustic plate 302, and the strobes 340, 342 and 344 can be independently operated to select points in the sections of line corresponding to the strobes.

Since the present invention is subject to many modifications, variations and changes in detail, it is intended that all matter in the foregoing description and in the accompanying drawings be interpreted as illustrative and not in a limiting sense.

What is claimed is:

1. An acoustic-wave device comprising:
a light modifying member having three dimensions, said member including layers of electret material and an electrooptic material associated with each layer of the electret material, said member being responsive to a combination of three mutually crossing acoustic waves and a non-acoustic energy condition, said energy condition being applied momentarily at preselected times when said acoustic waves are at preselected intersection points in the member, such that a changed, electrically polarized condition is produced at said intersection points in the electrooptic material,
means applying the acoustic waves to the member in three, mutually perpendicular directions,
means momentarily applying the non-acoustic energy condition to the member at said preselected times,
wherein the changed, electrically polarized condition includes a spatial change in light impinging on said member producing a three-dimensional image and wherein said spatial change is not affected by subsequent applications of said non-acoustic energy condition, and
wherein the changed, electrically polarized condition produced at each preselected point during the momentarily applied non-acoustic energy condition is a change in birefringence.

2. An acoustic-wave device as claimed in claim 1 wherein said electrooptic material is barium titanate.

* * * * *